United States Patent [19]

Abrahamson et al.

[11] 4,283,250

[45] Aug. 11, 1981

[54] SOLUTION-CONCENTRATING APPARATUS

[76] Inventors: Carl-Hugo Abrahamson, Batmanskroken 5,, S-126 57 Hägersten; Björn Heed, Utlandagatan 19, S-412 61 Göteborg, both of Sweden

[21] Appl. No.: 118,911

[22] Filed: Feb. 6, 1980

[30] Foreign Application Priority Data

Feb. 9, 1979 [SE] Sweden ............................. 7901174

[51] Int. Cl.³ .............................................. B01D 1/24
[52] U.S. Cl. .................... 159/9 R; 159/11 B; 159/DIG. 28; 159/1 W; 202/236
[58] Field of Search ................... 159/1 C, 1 W, 11 B, 159/10, 9 R, 11 R, 9 A, DIG. 28; 202/236, 238

[56] References Cited

U.S. PATENT DOCUMENTS

| 17,448 | 6/1867 | Partz | 159/11 B |
|---|---|---|---|
| 2,386,826 | 10/1945 | Wallach et al. | 202/236 |
| 3,309,021 | 3/1967 | Powers | 159/DIG. 28 |

Primary Examiner—Norman Yudkoff
Attorney, Agent, or Firm—Fleit & Jacobson

[57] ABSTRACT

An apparatus for concentrating a liquid solution comprises a plurality of spaced-apart plates arranged for rotation about a substantially horizontal axis; means for supplying solution to the surfaces of said plates, said surfaces being arranged to be exposed to heat and/or flowing gas for vaporizing a readily vaporizable constituent from the solution passed to the surfaces of said plates; and means for collecting concentrated products. The plates are provided with an outer layer of open-pore porous material having the ability to absorb solution; and the radially inner regions of said outer layers extend into a storage space for solution to be concentrated, said storage space being shielded from the outer-layer parts exposed to said heat and/or said gas by means of shielding means. In this way, the outer surfaces of said plates absorb solution from the storage space, rotation of said plates contributing to uniform dispersion of the solution over the surfaces of said plate layers exposed to said heat and/or said flowing gas.

7 Claims, 3 Drawing Figures

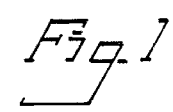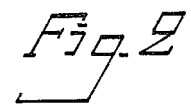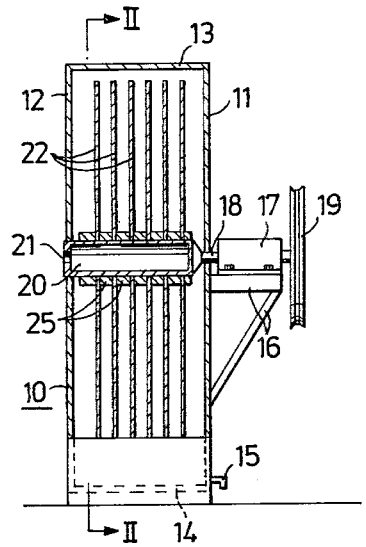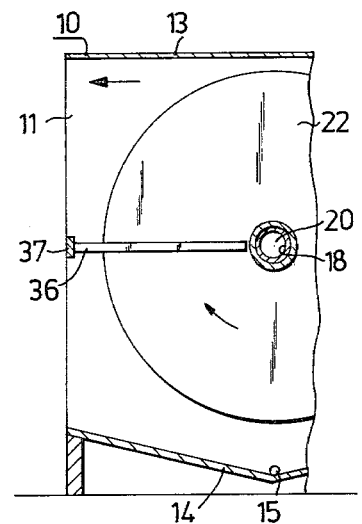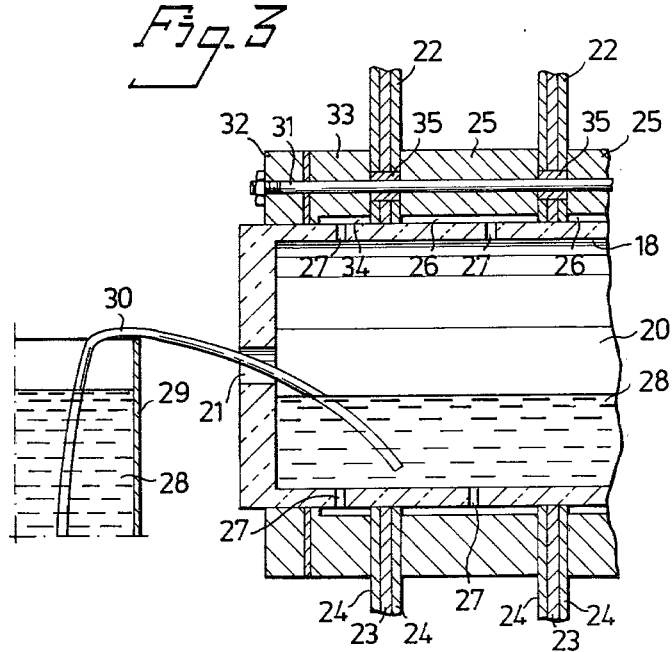

SOLUTION-CONCENTRATING APPARATUS

The present invention relates to an apparatus for concentrating liquid solutions, said apparatus being of the kind which comprises a plurality of mutually separated plates arranged for rotation about a substantially horizontal axis; means for supplying solution to the surfaces of said plates, said surfaces being arranged to be exposed to heat and/or a flowing gas for the purpose of vapourizing a relatively readily vapourizable constituent from the solution passed to said plates surfaces; and means for collecting concentrated products.

For the purpose of generating heat or cold, processes have been suggested in which there are used substances, such as aluminium chloride or lithium chloride, for generating heat, and ammonium nitrate, ammonium chloride or sodium nitrate for generating cold, which substances when dissolved in or diluted with a solvent, such as water, give rise to positive or negative thermochemical energy or concentration-difference energy in the form of heat or cold respectively. In order to recover the dissolved or diluted substances, and optionally also the solvents, from the diluted solutions formed, it is necessary to concentrate the solutions. This creates the problem of providing a concentrating apparatus which is sufficiently cheap and simple, while at the same time, being sufficiently effective, to render the processes based on concentration-difference energy competitive with classic methods of generating heat or cold.

The object of the present invention is therefore to provide an apparatus in which the aforementioned problem is at least substantially solved.

Accordingly this invention consists in an apparatus of the kind described in the introduction, in which at least one outer layer of said plates comprises an openpore, porous material able to absorb said solution, the radially inward region of said surface layer extending into a storage space for solution to be concentrated, said storage space being shielded by shielding means from those parts of the outer layer exposed to the heat and/or the gas. Through this arrangement a substantially uniform distribution of solution in the porous outer layer can be obtained with the minimum of equipment and energy consumption, concentration of this solution increasing in a direction towards the surface exposed to said heat and/or said gas. Further, the whole of the outer layer is available for concentrating purposes, and the outer surface can be readily adapted with respect to its area, thickness and absorption ability, so that it is constantly supplied automatically with a suitable quantity of solution from the supply space without the need of such ancillary equipment as pumps or the like.

In a preferred embodiment, the plates are mounted on a hollow tubular shaft, the internal cavity of which is arranged to accommodate solution to be concentrated, and which is provided with an inlet for said solution, passage means being arranged for supplying solution to the radially inner region of said surface layer. In this case, the shielding means may, to advantage, comprise spacer rings arranged externally on the tubular shaft between said plates, said passage means including a clearance present between the inner surfaces of the spacer rings and the outer surface of the tubular shaft, and openings in said shaft for establishing communication between the cavity of the tubular shaft and the clearances.

For the purpose of obtaining maximum efficiency and, at the same time, a stable construction, the plates preferably include a rigid intermediate layer, which is covered on both sides thereof with a porous outer layer.

The porous outer layers suitably comprise a fabric or cloth stretched over respective plates or some other soft porous material, for example a material of sponge-like consistency.

To ensure unhindered supply of solution to the soft porous outer layers, distance elements made of a substantially rigid material may be arranged to extend through the plates between adjacent spacer rings, in order to prevent the porous outer layers being compressed between the spacer rings.

An exemplary embodiment of the invention will now be described in more detail with reference to the accompanying schematic drawing, in which FIG. 1 is an end view, partly in section, of an apparatus according to the invention, FIG. 2 is a partial sectional view taken on the line I–II in FIG. 1, and FIG. 3 is a sectional view, in larger scale, of a part of the apparatus illustrated in FIGS. 1 and 2.

In the drawing, in which coinciding elements are identified by the same references in the various figures, there is illustrated an apparatus for concentrating solutions, said apparatus comprising an open-ended casing 10 having side walls 11, 12, an upper wall 13 and a bottom 14. The bottom 14 slopes downwardly from the open ends of the casing 10, to form a collecting trough for concentrated solution, and is provided at its lowermost level with an outlet pipe 15 for the concentrated solution. Optionally, the solution may be concentrated to such an extent that a solid, crystalline or amorphous residue is obtained, in which case the outlet pipe is replaced with a device suitable for discharging such solid material, for example an outfeed screw.

Mounted on one side wall 11 of the casing 10 is a bracket structure 16, which, in turn, carries a bearing 17 for a substantially horizontal shaft 18. Arranged on the shaft 18 externally of the bearing 17 is a belt pulley 19 intended to be connected, via a belt (not shown), to a drive motor (not shown) for rotating the shaft. The shaft 18 extends completely through the casing 10 and the section of the shaft located within said casing has the form of a hollow tubular shaft with an internal cavity 20. The cavity 20 is closed at its end facing the pulley 19 and is provided at its other end with a supply opening 21, to enable solution to be concentrated to be introduced into said cavity.

Arranged on the hollow tubular section of the shaft 18 is a plurality of mutually spaced plates or disks 22 which, as will best be seen from FIG. 3, each comprises a rigid intermediate layer 23, which imparts sufficient rigidity to the disk, and which has arranged on both sides thereof a porous outer layer 24 which is capable of absorbing the solution and which may consist of a soft resilient material, such as a material of sponge-like consistency and optionally swellable when wet. The main plane of the disks 22 is substantially perpendicular to the shaft 18, which passes through the centre of the disks. Arranged between the disks 22 are spacer rings 25 whose inner diameters exceed the outer diameter of the tubular shaft section. In this way, there is formed between the outer surface of the tubular shaft section and the inner surfaces of the spacer rings, spaces or clearances 26 into which the radial inner parts of the disks extend. The spaces communicate, through openings 27 in the wall of the tubular shaft section with the cavity 20. The cavity 20 and the passage means formed by the openings 27 and the spaces 26 thus form a storage space for the solution to be concentrated. Solution in the tubular shaft section is illustrated in FIG. 3 at 28, the said tubular shaft section being only partially filled. The reference 29 identifies a vessel for accommodating solution, said solution being supplied to the cavity 20 through a hose 30 by means of a siphoning effect. It lies within the scope of the invention, however, to supply the solution to the cavity of the tubular shaft under pressure, by means of a pump.

The disks 22 and the spacer rings 25 are pressed together axially to form a pack, by means of a plurality of pull-rods extending parallel with the tubular shaft section and distributed around the circumference thereof, of which pull-rods one is illustrated at 31 in FIG. 3. The pull rods extend through bores in the disks and spacer rings, and through ring-shaped end pieces, of which two are shown at 32 and 33 in FIG. 3, the axially inner end piece being provided with a part having an enlarged diameter to form a gap 34 which communicates with the cavity 20 through openings 27, even at the remotest porous outer layer 24 of the outermost disks 22 located in the pack. When the outer layers 24 comprise a soft, porous material, the said outer layers 24 are prevented from being squashed together by means of distance elements 35 which are arranged between the spacers 25 and passed through the disks 22, and which are made of a substantially rigid material.

When the solution is concentrated to such an extent that there is formed on the surfaces of the disks exposed to heat and/or gas a solid, adhering residue, scrapers are arranged which extend between mutually adjacent disks 22 close to the exposed surfaces, for the purpose of removing material formed thereon. One such scraper is illustrated at 36 in FIG. 2, said scrapers being carried by a beam 37 extending between the walls 10, 11.

When using the illustrated solution-concentrating apparatus, solution is passed, either continuously or intermittently, optionally in a pre-heated state, to the cavity 20, from which it passes into the spaces or gaps 26, 35 through the openings 27. The solution is absorbed from said spaces by the porous outer layers 24, the shaft 18, with disks 22 firmly mounted thereon, being rotated relatively slowly, so that uniform dispersion of the solution over respective discs 24 is promoted, without the solution being thrown from the peripheral surfaces of the disks by centrifugal force. The open-ended casing 10 forms a passage through which gas can pass, said gas sweeping over the exposed surfaces of the disks and vapourizing solvent from the solution 28. The gas used may normally be ordinary dry-air, although cold air may also be used; in some instances it may be sufficient to ensure that the disks are swept with sufficient air to obtain effective concentration of the solution by exposing said disks to the wind. To this end, the apparatus may be rotatably arranged about a vertical axis for permitting the same to be set to an optimal position with respect to the wind direction. It also lies within the scope of the invention, however, to use hot air or some other gas for concentrating said solutions, and to force said gas through the casing 10 by means, for example, of a fan. Suitable directions of flow of said gas and direction of rotation of the disks are indicated by arrows 40 and 41, respectively in FIG. 2. If the solvent present in the solution is valuable, it may be recovered. To this end, the solution can be concentrated by, for example, heating the exposed surfaces of the disks or the casing, in which case the ends of the casing are closed and means are provided for collecting vapourized solvent from the interior of the casing.

Thus the invention is not limited to the illustrated and described embodiments, but can be modified within the scope of the following claims. It will be understood, that the invention is not limited to the concentration of the aforespecified solutions.

What we claim is:

1. An apparatus for concentrating a liquid solution, comprising a plurality of spaced apart plates arranged for rotation about a substantially horizontal axis extending through a centre region of said plates, each of said plates having at least one outer layer comprising an open-pore material having the ability to absorb such solution; means for supplying solution to the surfaces of said plates, said surfaces being arranged to be exposed to heat and/or a flowing gas for the purpose of vapourizing a relatively vapourizable constituent from the solution supplied to said surfaces; and means for collecting concentrated products, wherein the radially inner region of said outer layer extends into a storage space for solution to be concentrated, said storage space being shielded by shielding means from the parts of said outer-surfaces exposed to said heat and/or said gas.

2. An apparatus according to claim 1, wherein the plates are mounted on a tubular shaft having a cavity which is arranged to accommodate a solution to be concentrated; and wherein said tubular shaft is provided with an inlet for said solution, passage means being arranged for passing solution to the radially inner region of said outer layers.

3. An apparatus according to claim 2, wherein the shielding means comprises spacer rings mounted externally on the tubular shaft between said plates, said passage means comprising a clearance between the inner surface of each spacer ring and the outer surface of the tubular shaft and openings arranged in said shaft for establishing communication between the cavity of the tubular shaft and the clearances.

4. An apparatus according to claim 1 or 2, wherein the plates comprise a rigid intermediate layer which is covered on both sides thereof with a porous outer layer.

5. An apparatus according to claim 4, wherein the porous outer layers comprise a soft porous material.

6. An apparatus according to claim 3 wherein said porous outer layers comprise a soft porous material, and wherein distance elements of substantially rigid material extend through the plates between adjacent spacer rings for preventing the porous outer layers between said spacer rings being squashed.

7. An apparatus according to claim 6, wherein the plates comprise a rigid intermediate layer which is covered on both sides thereof with a porous outer layer.

* * * * *